United States Patent [19]

Rapp

[11] Patent Number: 4,713,787

[45] Date of Patent: Dec. 15, 1987

[54] ELECTRONIC NUMERIC GENERATOR

[75] Inventor: Edward J. Rapp, Cleveland Heights, Ohio

[73] Assignee: Fork, Inc., New Philadelphia, Ohio

[21] Appl. No.: 646,123

[22] Filed: Aug. 31, 1984

[51] Int. Cl.[4] ........................ G06F 1/02; G06F 15/28; A63B 71/00; A63F 1/00

[52] U.S. Cl. .................................... 364/717; 364/412; 273/138 A

[58] Field of Search ............... 364/717, 715, 706, 708, 364/709, 710, 410, 412; 273/138 A

[56] References Cited

U.S. PATENT DOCUMENTS

| | | | |
|---|---|---|---|
| 3,612,845 | 10/1971 | Lawlor | 364/717 |
| 3,946,215 | 3/1976 | May | 364/717 |
| 4,213,101 | 7/1980 | Policand et al. | 364/717 |
| 4,323,770 | 4/1982 | Dieulot et al. | 364/412 |
| 4,494,197 | 1/1985 | Troy et al. | 364/412 |
| 4,527,798 | 7/1985 | Siekierski et al. | 364/717 |
| 4,618,927 | 10/1986 | Hatta | 364/410 |

FOREIGN PATENT DOCUMENTS

| | | | |
|---|---|---|---|
| 3243777 | 8/1983 | Fed. Rep. of Germany | 273/138 A |
| 3307864 | 4/1984 | Fed. Rep. of Germany | 364/412 |
| 2147773 | 5/1985 | United Kingdom | 273/138 A |
| 2148135 | 5/1985 | United Kingdom | 273/138 A |

*Primary Examiner*—Gary V. Harkcom
*Assistant Examiner*—Long Thanh Nguyen
*Attorney, Agent, or Firm*—Oldham, Oldham & Weber Co.

[57] ABSTRACT

An enhancement to a typical four-function calculator. With this enhanced calculator, lottery players may generate psuedo-random integer combinations for their use in selecting numbers on which to place their bets. The enhanced calculator allows users to select the type of lottery game for which the number combinations will be generated by specifying the quantity of numbers generated and the bounds of the range within which the numbers will be generated through two key strokes of dedicated keys. The first key stroke utilizes a key designated by the particular lottery game. The second key stroke utilizes a key designated by a popular range of numbers used by the various lotteries. This invention relieves the user from having to rely on his limited supply of "magical" dates, ages, social security numbers and so forth.

4 Claims, 6 Drawing Figures

FIG. 4 MICROPROCESSOR AND KEYBOARD SCHEMATIC

ELECTRONIC NUMERIC GENERATOR

TECHNICAL FIELD

The instant invention resides in the art of electronics and electronic devices and in particular electronic calculators with special functions. This invention embodies an enhancement to a four-function calculator whereby a random integer generating routine is included to provide a means for generating number combinations for lottery games.

BACKGROUND ART

Heretofore it has been known to those skilled in the art that electronic calculators can be used to generate random numbers. Several methods are available and can be programmed into the read-only memory of calculators as separate routines. These routines can be called by other routines or by the user through dedicated keys.

All the methods used to generate random numbers with calculators rely on input parameters which define the bounds of the generated number, the seed of the psuedo random sequence and the quality of the pseudo randomness of the generated number. Various criteria are used to determine these input parameters including the length of the psuedo random cycle desired, the speed of the calculations and the trueness of the randomness of the numbers. Most of these parameters are previously determined and are written into the routines. Generally, the seed is selected just prior to execution of the routine to enhance the randomness of the psuedo random calculation.

Random number generating routines have been used in electronic games and other applications. Such electronic games have included jackpot machines, card games and the like and they use the routines to produce random card hands, wheel readouts and such.

To date, no one has produced a calculator which enables a user to utilize a random number generator to select numbers for lotteries by simple key strokes. Instead, lottery ticket purchases have had to rely on their own inventiveness and storage of dates, ages and so forth to produce their number combination.

SUMMARY OF THE INVENTION

In the light of the foregoing, it is an object of this invention to enable lottery players to use the invention to assist them in selecting their number combinations by allowing them to request psuedo random integer combinations with two simple key strokes.

It is another object of this invention to bound the psuedo randomly generated integer combinations within the range used by lottery games through a single key stroke.

It is still another object of this invention to display a user specified quantity of psuedo randomly generated numbers at one time on a display.

It is yet another object of this invention to randomly seed the psuedo random number generating routines by selecting the current count in the display multiplexer free-running counter to generate truer random numbers.

It is another object of this invention to allow a user to request random numbers by selecting key strokes designated for specific lottery games.

These and other objectives of the invention which will become apparent as the detailed description proceeds are achieved by an electronic numeric generator comprising:

first means for calculating psuedo random integer combinations, second means for allowing a user to select a quantity of integers in generated number combinations, third means for allowing a user to select bounds of range of integers generated, fourth means for displaying said generated number combinations, and fifth means for selecting a random seed for the psuedo random number generating routine from a display multiplexer counter.

BRIEF DESCRIPTION OF DRAWINGS

For a complete understanding of the objects, techniques and structure of the invention, reference should be had to the following detailed description and accompanying drawings, wherein.

DESCRIPTION OF THE PREFERRED EMBODIMENT

Figure 1:
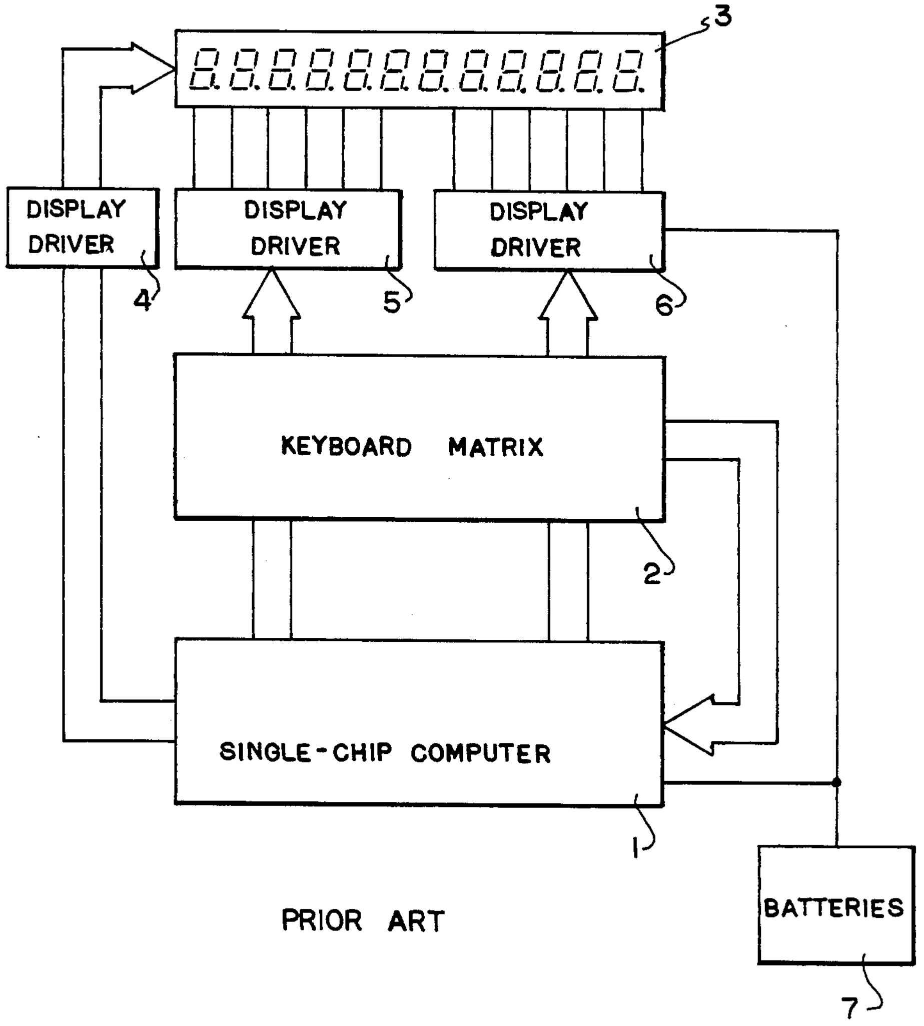
PRIOR ART FIG. 1
FIG. 1 is a block schematic showing the prior art based configuration of the calculator's electronic hardware.

Referring to the drawings, it can be seen that the best mode for carrying out this invention is by embodying a specialized random number generating algorithm in a hand-held electronic device such as a calculator.

In FIG. 1, it can be seen that the basic hardware requirements for the instant invention comprises a single-chip computer 1, a keyboard matrix trix 2, a 12 digit display 3, display drivers 4, 5 and 6 and battery power source 7.

Figure 2:
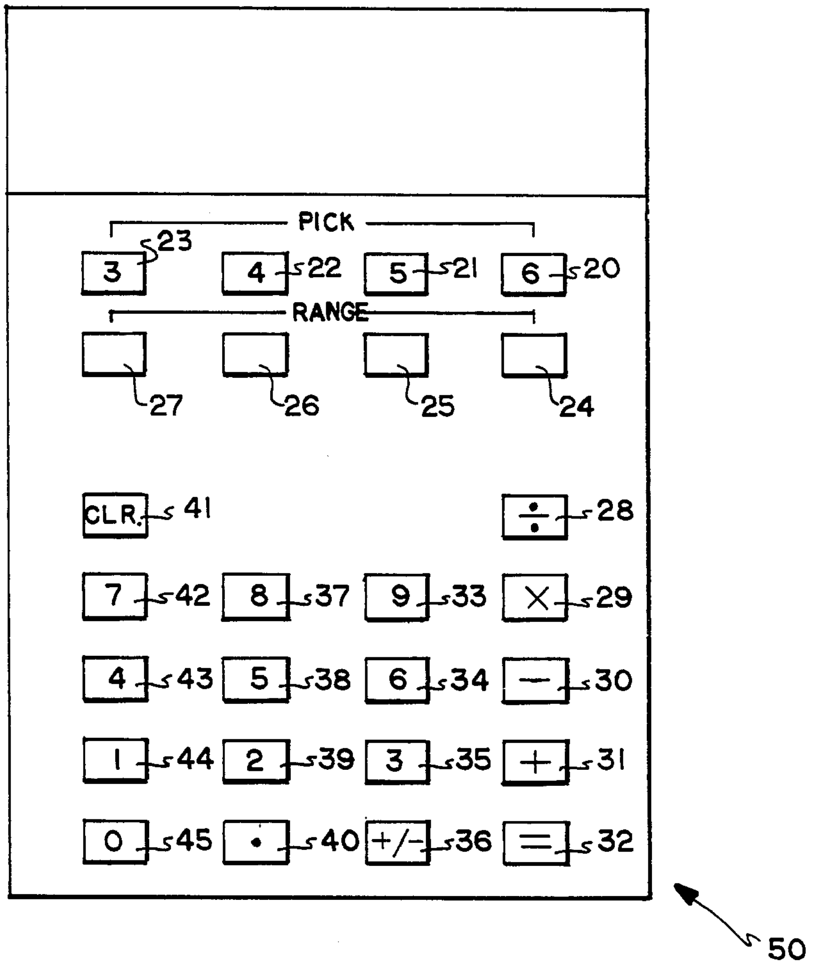
FIG. 2 is a top plan view of the layout of the calculator and lottery games keyboard.

Referring to FIG. 2, the physical layout of the keyboard can be seen. Keys 20, 21, 22 and 23 are dedicated to the random lottery number generating routine and are called the PICK keys. These keys allow a user to select the number of integers to be generated. The keys have marked on them the quantity of numbers utilized by popular lottery games.

Keys 24, 25, 26 and 27 are also dedicated to the routine which generates random lottery numbers and are called the RANGE keys. Four (4) popular ranges of lottery games are marked on the keys. Each RANGE key permits selection of only one (1) of these ranges.

Keys 28 -45 comprise a typical four (4) function calculator keyboard.

Figure 3:
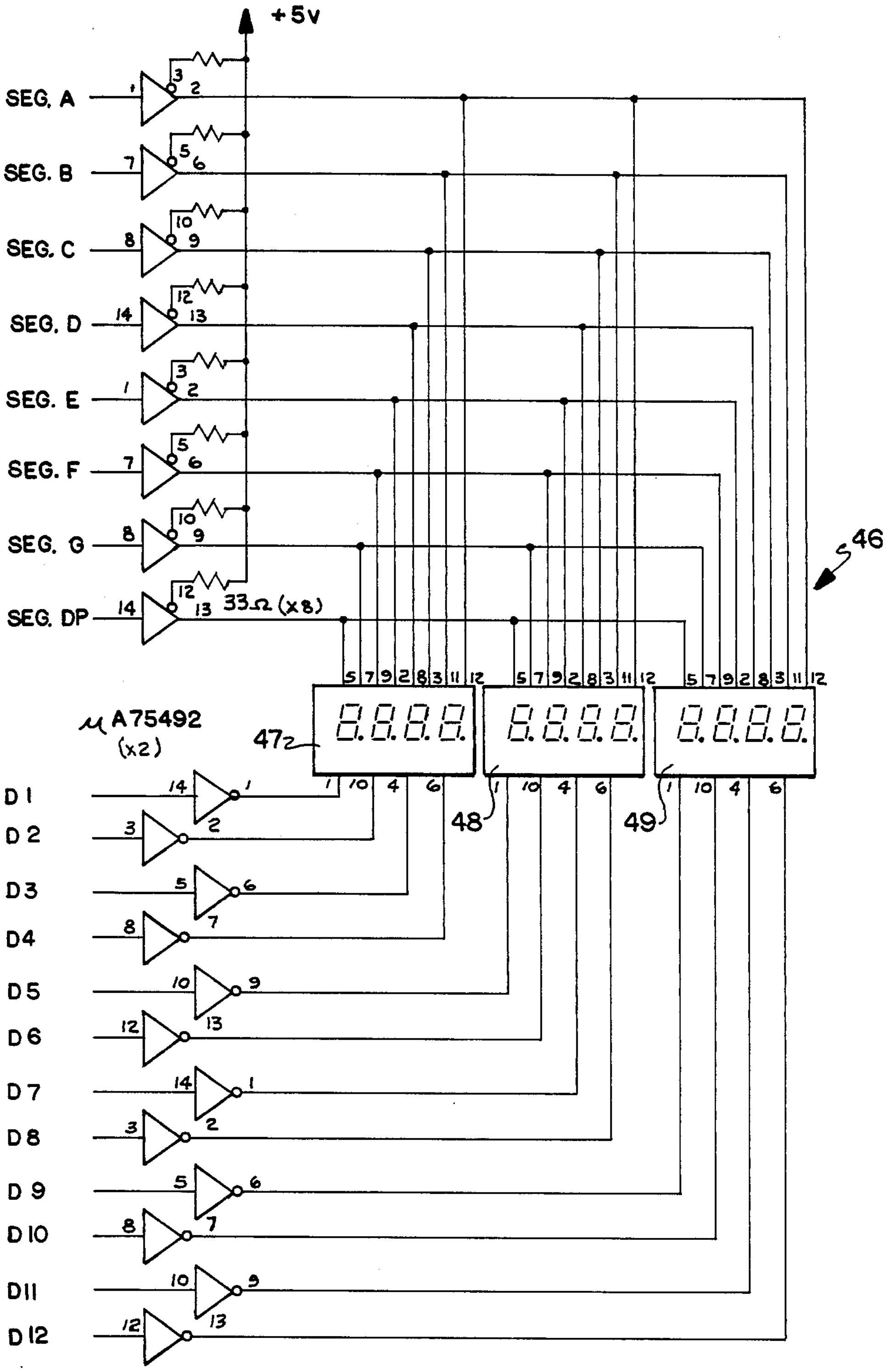
FIG. 3 PRIOR ART
FIG. 3 is the digital schematic layout of the display and display drivers.

From FIG. 3, it can be seen that a typical wiring scheme is employed to connect the 12 digit display, shown generally as 46, to the display drivers. The 12 digit display is actually comprised of three (3) four (4) digit displays 47, 48 and 49.

Figure 4:
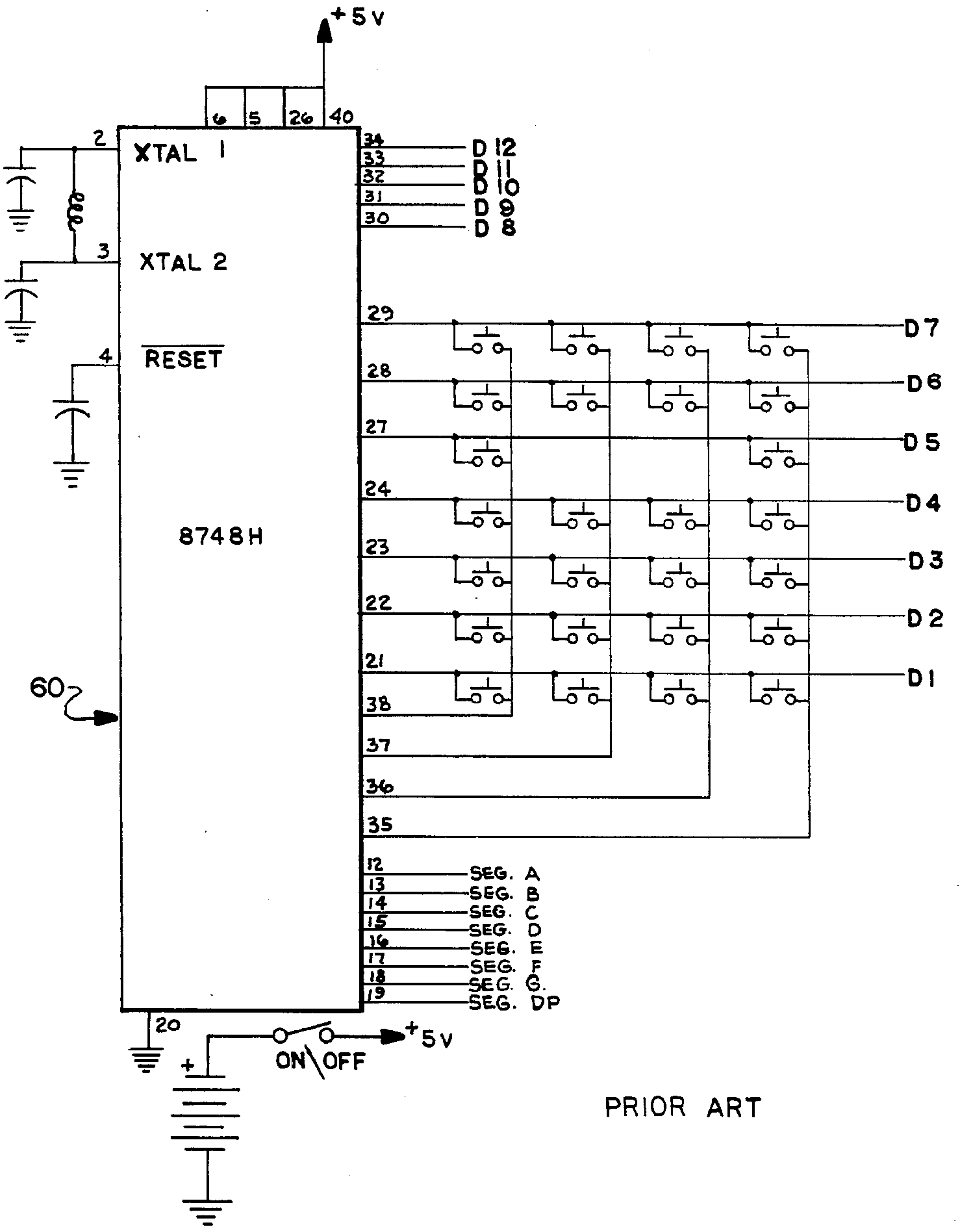
FIG. 4 is the digital schematic of the layout of the single chip computer, keyboard and battery.

Referring to FIG. 4, it can be seen that the instant invention utilizes a single-chip computer which is designated by the numeral 60. The computer presently used is the INTEL 8748H which contains internally both random access memory (RAM) and read only memory (ROM). The keyboard is designated generally as numeral 50 and is wired and arranged in typical polling arrangement.

Figure 5:
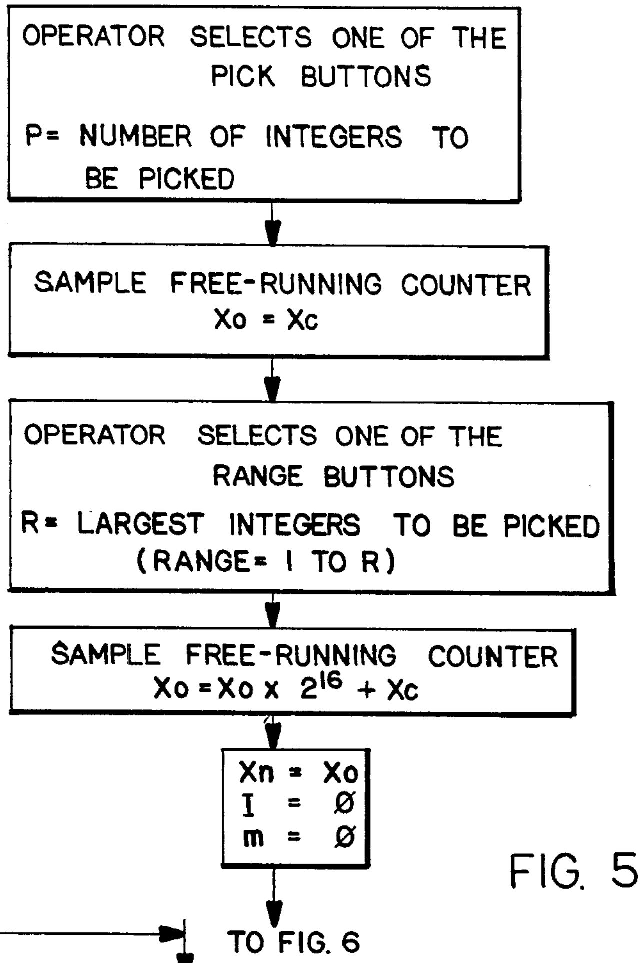
FIGS. 5 and 6 are flow charts for the algorithm which generates the random lottery numbers.
Figure 6:
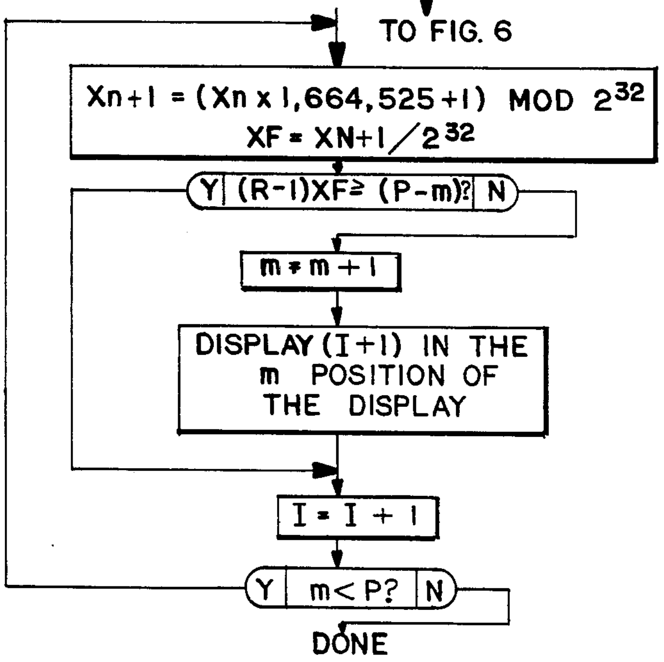

With an appreciation of the hardware structure of the invention, attention is now directed to FIGS. 5 and 6 wherein the programming flow chart of the specialized psuedo random number generating process is presented in detail. First, however, an overview of the process will be presented.

Given the range within which the integers are to be generated and the desired number of integers, the random number generating process will generate numbers in ascending order. The routine will sequence through the given range beginning with one and continuing upward in increments of one, until the upper limit is reached or the desired number of integers have been generated, whichever occurs first.

During this sequencing, as each integer is evaluated, a probability is calculated as to its occurance. Should its probability be low enough, the integer will be included in the integer combination presented to the user. Otherwise, the sequencing continues with the next integer in the sequence.

Focusing more on the detail presented in FIGS. 5 and 6, it can be seen that to commence the process, a user selects the PICK key corresponding to the number of integers desired. When the key is pressed, the value associated with it is stored in the computer's memory and designated P. The program then samples the free-running display multiplexer counter to obtain one half of the seed for the psuedo random number generating equation. This value is designated Xc.

Next the user selects the range within which the integers of the integer combination will fall. When the selected RANGE key is depressed, the value for the upper range limit associated with it is stored in the computer's memory as R. At the same time a second sample is obtained from the display multiplexer counter. The first sample is shifted left by 16 bits and the second sample is added to it to produce a 32 bit word or number labeled Xo. This number is the seed for the following random number generating equation:

$$Xn+1=(Xn\cdot 1{,}664{,}525+1)\ mod\ 2^{32}$$

Where Xn is initially the seed Xo and thereafter represents the last number generated and Xn+1 is the number generated. Internally to the computer, however, Xn and Xn+1 are the same.

After generating the seed, the sequencing loop counter I is set to 0 and the counter M tracking the number of integers generated is also set to 0. The sequencing loop counter is set to 0 because when its evaluation is positive, the loop counter plus 1 is sent to the display and is included in the generated number combinations rather than the loop counter.

After Xn+1 is generated, it is divided by $2^{32}$ to produce XF, a fraction which ranges between 0 and 1. This fraction represents the probability of the current integer being evaluated in the sequencing occurring. The fraction XF is then multiplied by the number of integers left to evaluate to determine the current loop-counter-plus-one's probability of occurring within those numbers left to evaluate. The result is compared with the number of integers needed to complete the desired integer combination. If the probability is too high, then that integer is discarded, the loop counter is incremenated and the process is repeated.

Thus, for example, if the loop counter is equal to 5, the integer being evaluated is 5+1 or 6. Assuming the range was selected to be 1–40 and the desired number of integers is 6 and that 2 integers have already been included in the number combination, the following evaluation could occur:

XF=0.5
40−5=35=number of integers left to evaluate
35·XF=17.5: or, the probability of 6 occuring is 17.5 out of 35
6−2=4=number of integers needed to complete integer combination.

17.5 out of 35 is greater than or equal to desired probability of 4 out of 35. Therefore, 6 is rejected and the loop counter incremented.

Should an integer be accepted, the current count of integers included in the integer combination is incremented by 1 and the sequencing loop counter plus one, or integer being evaluated, is sent to the display and placed in the current count position. Then the sequencing loop counter is incremented by one to enable evaluation of the next highest integer.

Most multiple random number generators, used to generate groups or combinations of numbers in which no two (2) numbers may be equal, must evaluate the generated number against previously generated numbers to insure that no repetitions of any one number have occurred. However, because the instant invention relies on sequencing and a calculation of a psuedo probability for each integer, each number is only evaluated once and is never considered again. That is to say, an integer may only be included in a combination when its turn occurs in the sequence which may only be possible once during a routine run.

The final check point tests whether the integer combination is complete. As long as the count of integers in the generated combination is less than the desired total, the program will repeat the psuedo random number generating process. When they are equal, the routine terminates and the user is once again able to execute the routine.

Thus it can be seen that the objects of the invention have been satisfied by the structure and techniques presented hereinabove. While in accordance with the patent statutes, only the best mode and preferred embodiment of the invention has been presented and described in detail. The invention is not limited thereto or thereby. For an appreciation of the true scope and breadth of the invention, reference should be had to the following claims.

What is claimed is:

1. An electronic numeric generator, comprising:

first means for calculating psuedo random integer combinations;

second means connected to said first means for allowing a user to select a quantity of integers for forming said psuedo random integer combinations;

third means connected to said first means for allowing a user to select bounds of the range of said integers for said psuedo random integer combinations;

fourth means connected to said first means for visually displaying said psuedo random integer combinations;

a display multiplexer counter;

fifth means connected to said first means for selecting a random seed for said psuedo random integer combinations from said display multiplexer counter; and sixth means connected to said first means for choosing random integers within a range based on the probability of the occurrence of each integer, and sequencing through said range of integers in ascending order and choosing those integers which fall within a specified probability.

2. An electronic numeric generator as recited in claim 1 wherein said second and third means comprise a keyboard having dedicated keys to allow a user to select the quantity of integers generated in integer combination and the bounds of the range of generated integer combinations;

said dedicated keys being comprised of eight (8) keys placed on two (2) rows, four (4) keys per row; one of said rows comprised of keys designated with four (4) popular lottery games; said other row comprised of keys designated with bounds of four (4) popular ranges of lottery game numbers.

3. An electronic numeric generator as recited in claim 1 which further comprises means for displaying said integers in ascending order on said display.

4. Apparatus for numerical generation and calculation, comprising:

a keyboard having a plurality of keys thereon;

a first set of keys of said plurality of keys on said keyboard operative to select a quantity of randomly generated numbers;

a second set of keys of said plurality of keys in said keyboard operative to define a range containing all of said randomly generated numbers;

a display presenting visual indicia of said randomly generated numbers;

means connected to said first and second sets of keys for generating said quantity of randomly generated numbers within said range, generating a seed number from which said randomly generated numbers are evolved, and assuring that said quantity of randomly generated number does not include any two (2) identical numbers; and wherein said keyboard further includes a set of keys bearing the digits 0–9 and the indicia of the four (4) basic arithmetic functions.

* * * * *